(No Model)
W. N. PORTER.
HEATING DEVICE FOR SHOE SEWING MACHINES.
No. 509,823. Patented Nov. 28, 1893.
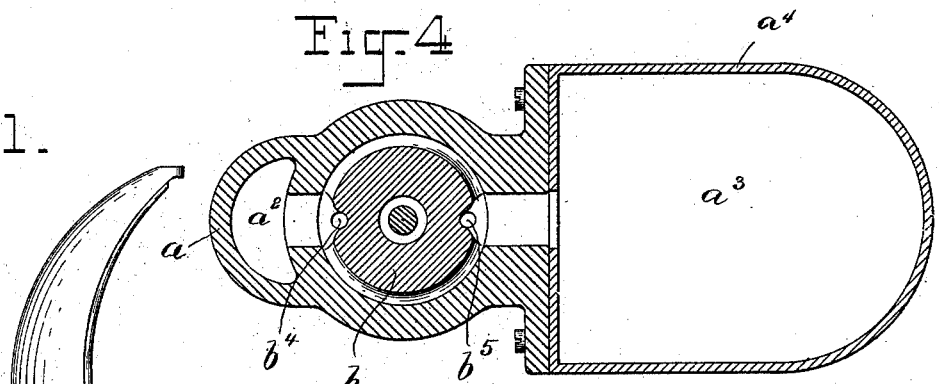
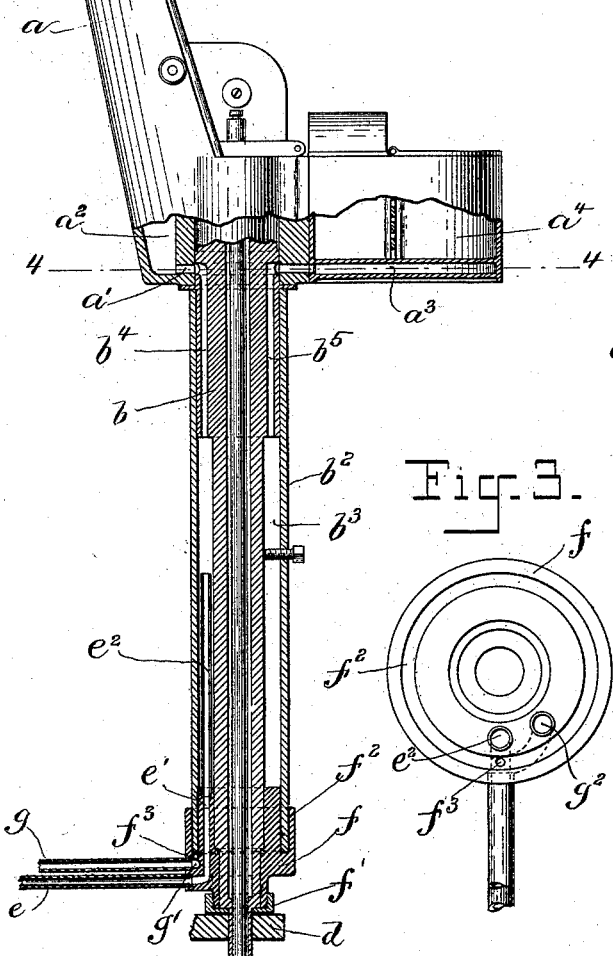
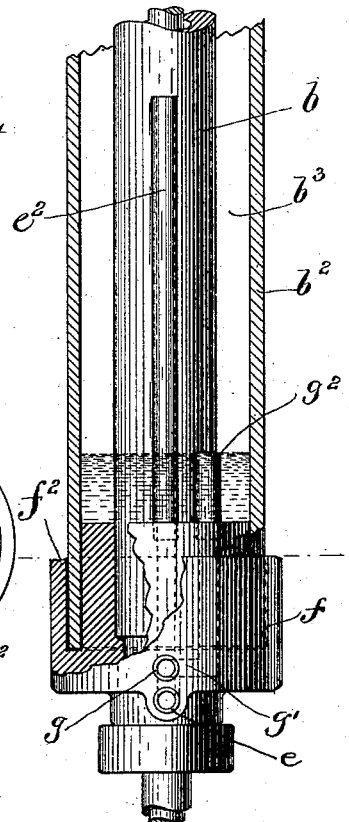
Witnesses.
John F. Nelson.
M. W. Jackson.
Inventor.
W. N. Porter
by Wright Brown Crosley
Attys

UNITED STATES PATENT OFFICE.

WALLACE N. PORTER, OF BROCKTON, MASSACHUSETTS, ASSIGNOR TO O. A. CAMPBELL, JR., OF SAME PLACE, AND WALTER PEARSON, OF WHITMAN, MASSACHUSETTS.

HEATING DEVICE FOR SHOE-SEWING MACHINES.

SPECIFICATION forming part of Letters Patent No. 509,823, dated November 28, 1893.

Application filed January 6, 1893. Serial No. 457,487. (No model.)

*To all whom it may concern:*

Be it known that I, WALLACE N. PORTER, of Brockton, in the county of Plymouth and State of Massachusetts, have invented certain new and useful Improvements in Heating Devices for Shoe-Sewing Machines, of which the following is a specification.

This invention relates to boot or shoe sewing machines in which a work-supporting horn is attached to a tubular shaft or spindle which is adapted to rotate on suitable supports, the horn being hollow and receiving steam for the purpose of heating it.

My invention has for its object to provide a reliable and durable connection between the movable horn and the fixed pipes which conduct steam to the horn and the water of condensation away from the horn.

To these ends the invention consists in the improvements which I will now proceed to describe and claim.

Of the accompanying drawings, forming part of this specification: Figure 1 represents a side view of a sewing machine horn, and a sectional view of the horn spindle and the parts of my improvement constituting the steam joint. Fig. 2 represents a partial side elevation and partial section of the horn spindle and steam joint. Fig. 3 represents a top view of the base or fixed member of the steam joint. Fig. 4 represents a section on line 4—4, Fig. 1.

The same letters of reference indicate the same parts in all the figures.

In the drawings: $a$ represents a sewing machine horn, and $b$ represents the tubular horn spindle or standard to which the horn is affixed, said horn and tubular spindle rotating together. The upper portion of the spindle $b$ is larger than the lower portion, said upper portion closely fitting and filling the interior of the casing $b^2$. The spindle, below said enlarged portion, is sufficiently reduced in diameter to form an annular chamber $b^3$ between the casing $b^2$ and the spindle, said chamber receiving steam from an inlet-pipe $e$, as hereinafter described. The upper portion of the spindle is provided with ports or steam passages $b^4$ $b^5$, one of which conducts steam from the chamber $b^3$ to a steam cavity or chamber $a^2$ within the horn. The other port communicates with a steam cavity or chamber $a^3$, which is located below the wax-pot $a^4$, the latter being affixed to the horn in the usual or any suitable way.

$f$ represents the fixed member of the steam joint, which provides for the admission of steam to the chamber $b^3$ and the escape of water of condensation therefrom, without permitting leakage of either steam or water. The member $f$ is an annular collar or fitting, which is supported by a step or support $d$, rigidly affixed to the frame of the machine, and is provided with a cap $f'$, which rests upon said step. The interior of the member or collar $f$ is formed to receive and constitute a bearing for the lower end of the spindle $b$, the portion of the spindle within said sleeve or member $f$ being shouldered and bearing on corresponding shoulders within the sleeve or member, so that the latter supports the spindle against downward movement.

The sleeve $f$ is provided with an annular recess or groove $f^2$, extending downwardly from its upper end, and made of such size as to receive the lower end of the casing $b^2$, the width and depth of the annular recess being such that the lower end of the casing enters it without being in rubbing contact with the sides and bottom of said recess. The steam inlet-pipe $e$ enters the lower portion of the collar $f$, and said collar is provided with a vertical passage or conduit $e'$, constituting a continuation of the inlet-pipe $e$, and with a pipe $e^2$ constituting a continuation of the conduit $e'$ and extending upwardly into the chamber $b^3$.

$g$ represents an outlet-pipe, which communicates with a conduit $g'$ formed in the sleeve $f$, said conduit extending laterally from the point of entrance of said pipe, and thence upwardly to the upper end of the sleeve as indicated in broken lines in Fig. 2 and being provided with an upwardly-projecting pipe $g^2$, which extends into the chamber $b^3$, although not to so high a point as pipe $e^2$.

$f^3$ represents an outlet port, leading from the bottom of the annular recess $f^2$ into the outlet-pipe $g$, said outlet being of sufficient size to permit the escape of the water of condensation that may accumulate in the recess $f^2$ and prevent such water from overflowing from the mouth of said recess and its communication with said pipe being distinct from that of the conduit, $g'$, therewith, as indicated by broken lines in Fig. 2.

It will be seen that the described size of the recess $f^2$ with relation to the lower end of the casing, whereby the casing enters said recess without coming in contact with the walls or bottom thereof, causes the lower end of the casing to be surrounded by a water seal, which is that portion of the water of condensation that accumulates in the very narrow spaces between the walls of the recess $f^2$ and the surfaces of the tubular casing, said seal preventing the escape of steam through the recess $f^2$. The outlet port $f^3$ is located at one side of the recess, so that there is always a sufficient accumulation of water of condensation in the lower part of the recess $f^2$ to act as a seal, as above described. The freedom of contact between the lower end of the casing and the walls of the recess prevents all wear of said parts, so that the joint is maintained in operative condition, and is not affected by the rotating movements of the horn. It should be borne in mind that the outlet port $f^3$ permits the escape of water from the bottom of the recess $f^2$ just rapidly enough to prevent the overflow of water from said recess without permitting the recess to be at any time emptied of water when the machine is in use and condensation is taking place in the chambers $a^2$, $a^3$ and $b^3$. In the event of the accumulation of more water in the chamber $b^3$ than can escape through the outlet port $f^3$, such water escapes through the pipe $g^2$.

I claim—

1. The combination with a sewing machine horn of a tubular spindle affixed to the horn and reduced in diameter below its upper end, a tubular casing affixed to the spindle and forming with the reduced portion of the spindle an annular steam chamber, and a fixed sleeve or joint member having a central socket or bearing receiving the lower portion of the spindle and an annular socket or groove formed and arranged to receive the lower end of said casing without wearing contact therewith, the sleeve being provided with a steam inlet communicating with the steam chamber, and with a steam outlet communicating both with the said chamber and with the bottom of the annular groove, as set forth.

2. The combination of a sewing machine horn having a steam chamber, a wax-pot attached to the horn and having a steam chamber, a horn spindle having an enlarged upper portion containing ports or conduits communicating with the chambers in the horn and wax-pot, said spindle being reduced in diameter below its upper end, a tubular casing affixed to the spindle and forming with the reduced portion of the spindle an annular steam chamber, and a fixed sleeve or joint member having a central socket or bearing receiving the lower portion of the spindle and an annular socket or groove formed and arranged to receive the lower end of said casing without wearing contact therewith, the sleeve being provided with a steam inlet communicating with the steam chamber, and with a steam outlet communicating both with the said chamber and with the bottom of the annular groove, as set forth.

In testimony whereof I have signed my name to this specification, in the presence of two subscribing witnesses, this 29th day of September, A. D. 1892.

WALLACE N. PORTER.

Witnesses:
A. D. HARRISON,
M. W. JACKSON.